Figure 4:
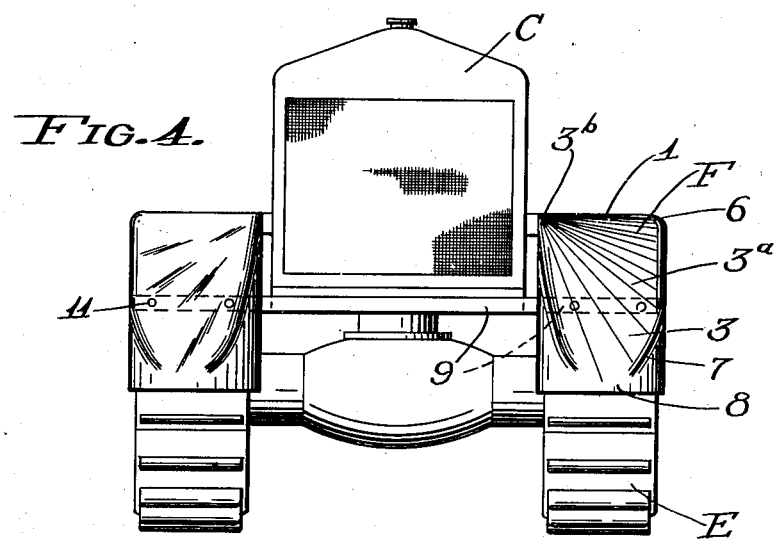

April 19, 1932. J. M. BOWMAN 1,854,174
FENDER FOR AGRICULTURAL IMPLEMENTS
Filed March 20, 1930   2 Sheets-Sheet 1
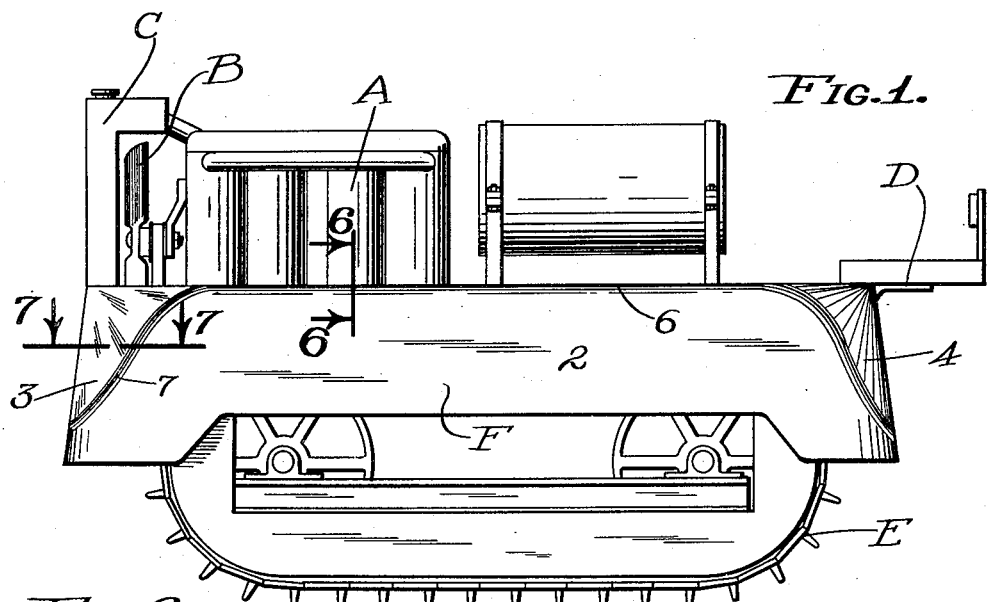
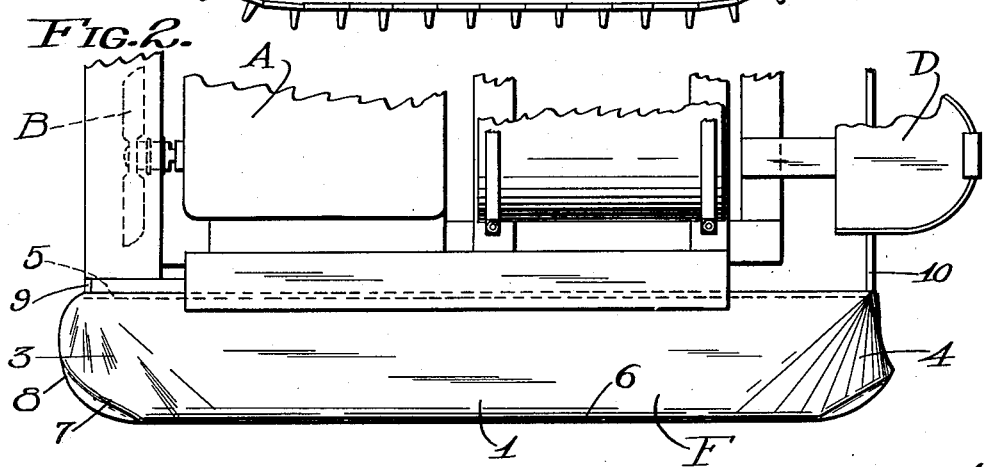
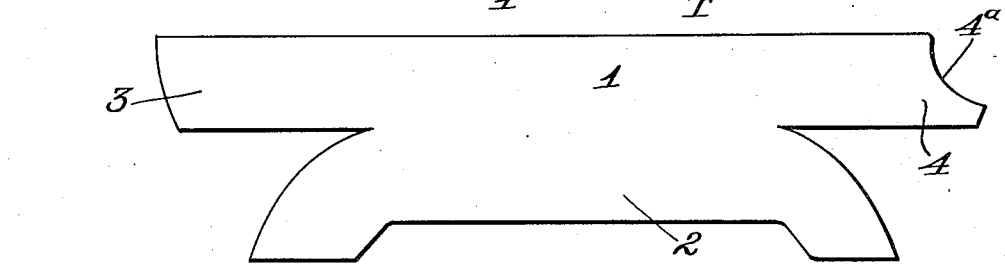
INVENTOR
JOHN M. BOWMAN.
BY A. B. Bowman
ATTORNEY April 19, 1932.  J. M. BOWMAN  1,854,174

FENDER FOR AGRICULTURAL IMPLEMENTS

Filed March 20, 1930  2 Sheets-Sheet 2

INVENTOR
JOHN M. BOWMAN
BY A. B. Bowman
ATTORNEY

Patented Apr. 19, 1932

1,854,174

UNITED STATES PATENT OFFICE

JOHN M. BOWMAN, OF SANTA ANA, CALIFORNIA

FENDER FOR AGRICULTURAL IMPLEMENTS

Application filed March 20, 1930. Serial No. 437,312.

My invention relates to tractors, and in general to all agricultural implements used in orchards or around trees, shrubs and bushes, and more particularly to fenders used on or in connection with such tractors or other agricultural implements.

The objects of this invention are: first, to provide a fender over the tread members of a tractor, having an exposed engine and cooling fan in front of the engine and behind the radiator, for preventing the dust and sand accumulating on or carried over the upper portion of the tread members from blowing into the driver's face by reason of the action of the cooling fan; second, to provide a fender for implements of this class whereby the foliage of trees, shrubbery, bushes, and the like, is not cut or broken when engaged by the fender, such safety or protecting feature to the foliage being provided by amply rounded corners at the exposed portions of the fender; third, to provide a fender of this class whereby the foliage encountered by the fender is either picked up by the fender and carried over the top of the same, or is brushed off from the fender or deflected to the side thereof by reason of the peculiar construction of the forward end of the fender; fourth, to provide a fender of this class having a relatively deep side wall or apron against which the foliage may slide until clear of the fender, thus protecting both the tread mechanism under the fender and also protecting the foliage from being broken or scarred or for preventing the fruit from being injured or knocked off; fifth, to provide a fender of this class having a cut out portion at its rear end to provide clearance for the draw bar or a trailing implement hitched to the drawing tractor or implement, thus providing a structure for making short turns and also preventing the fender from being crushed; sixth, to provide a fender of this class which is formed of a single piece of sheet metal, thus providing for rigidity and economy of construction; seventh, to provide as a whole a novelly shaped and novelly constructed fender of the class mentioned; and, eighth, to provide a fender of this class which is simple of construction and which is easy to install.

Figure 5:
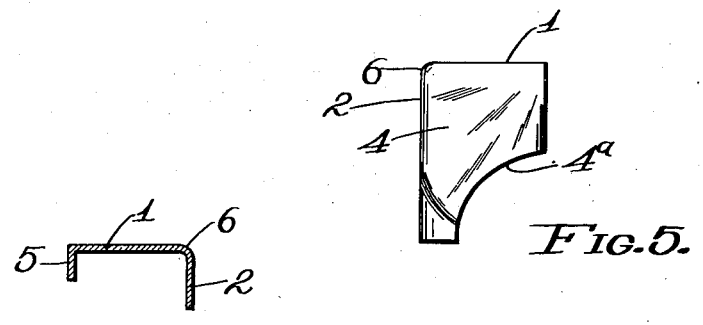
Figure 6:
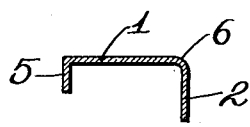
Figure 7:
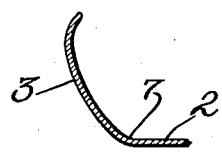

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side elevational view of a tractor showing my fender in one form mounted thereon; Fig. 2 is a fragmentary view in plan showing one side of the tractor with my fender mounted thereon; Fig. 3 is a developed view showing the approximate shape to which the fender is cut before forming the same; Fig. 4 is a front elevational view of the tractor with my fenders mounted thereon; Fig. 5 is a rear elevational view of the left fender; and, Figs. 6 and 7 are, respectively, sectional views taken through 6—6 and 7—7 of Fig. 1.

Like characters of reference refer to similar parts and portions throughout the views of the drawings.

In the drawings, I have illustrated my fender in connection with and mounted on a tractor and on a tractor of a particular type. The tractor shown is an open type tractor, that is, one in which the engine, designated A, and the cooling fan, designated B, are exposed. The fan B is positioned in front of the engine A and behind the radiator, designated C, for drawing the air through the radiator. In this type of tractor construction, the air drawn through the radiator is blown to the opposite sides of the engine toward the drivers' seat D at the rear end of the tractor. When no protection is provided over the tread members E which carry the tractor, the air is free to blow the dust and dirt from the upper portion of the tread members into the driver's face. I have provided fenders F which are mounted at the opposite sides of the frame of the tractor and extend over the tread means, thus preventing the air directed backwardly from the fan from picking up any dust and dirt lodged on the tread means.

The tread means in the tractor shown consists of a track laying tread mechanism, such as is employed in the so-called caterpillar tractor. My fender when employed in connection with such a tread mechanism consists of a long fender extending from end to end of the track as well as considerably backwardly and forwardly from the forward and rear ends thereof.

My fender, as illustrated in the drawings, consists preferably and essentially of five parts, namely, an upper wall 1, a side wall or apron 2, front end wall 3, rear end wall 4, and a reinforcing and securing flange 5 at the inner edges of the top wall and the end walls. These several portions enumerated are formed from a single piece of sheet metal of heavy gage.

The top wall 1 is flat, is positioned at a right angle to the side wall or apron 2, and is joined with the latter by a considerably rounded corner portion 6.

The front end wall extends from its front lower edge, which is positioned substantially in the horizontal median plane passing through the track laying tread mechanism, in angular form upwardly and backwardly and merges with the forward end of the top wall in considerably rounded curved form, as shown best in Fig. 1. The horizontal cross sections, as shown in one instance in Fig. 7, show the front wall to be at an obtuse angle to the side wall or apron, and also joined with the latter in gradual curves, indicated by 7. The front wall is in the form of a warped plane with the elements, indicated by 3a, and the surface generated from a point 3b at the forward end of the inner edge of the upper wall and substantially the forward edge of the side wall or apron as the directrices. Such shape of the front end wall permits the fender to be formed easily from heavy gage material.

The nose of the fender is also rounded horizontally, as indicated by 8, this rounded nose merging with the inclined front end wall in gradual curves, as shown best in Fig. 4.

The rear end wall is similarly formed, as shown in Figs. 1, 2 and 5. The rear end wall, however, is provided with a cut out portion 4a which provides clearance for the draw bar of the following implement (not shown) which is connected to the tractor, the cut out portion providing clearance for making short turns without crushing the rear ends of the fenders.

The edges of the front and rear walls are rounded, as are also the forward and rear ends of the side walls. After the side walls are bent at an angle to the top wall, the edges of the front and rear walls are welded to the forward and rear edges of the side walls, the front and rear ends of the original plate having cut out wedge portions, as shown in Fig. 3, to permit such bending and forming.

The reinforcing and securing flange 5 is bent inwardly from the inner edges of the top and end walls as integral portions of the latter for providing a rigid and economical construction. This flange is employed by securing the fender intermediate its ends, to the side of the frame of the tractor or other implement.

In addtion to said flanges, the fenders are secured to the frame of the tractor or other implement by brackets 9 and 10. These brackets are in the form of straps secured intermediate their ends to the front and rear ends of the frame of the tractor. The ends of these brackets or straps extend through the sides of the fenders or the flanges 5, and against the inner sides of the front and back wall members and are secured thereto by any suitable means such as rivets 11.

Thus, it will be seen that when the tractor or any other implement fitted with my fender, is drawn adjacent trees, shrubs or bushes so that the foliage or branches thereof engage the edges of the fender, the foliage is not cut or injured in any way. If long branches extend over the front ends of the fenders, the same are raised, by reason of the backward inclination of the front ends, to the top sides of the fenders permitting the fenders to pass thereunder without injury to the foliage or fruit thereon. If the branches or foliage are short enough, the same will be deflected from the front ends of the fenders, by reason of the horizontal angle of the forward end walls thereof toward the sides of the fenders and permitted to drag along the side walls or aprons thereof without injuring the same.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a means of the class described, the combination with an agricultural implement, of fenders mounted at the sides of the implement, said fenders having top and side walls and rounded longitudinally extending corners joining the top and side walls, the forward and rear ends of the upper walls extending downwardly and outwardly in angular and curved form and merging with the side walls in rounded corners.

2. In a means of the class described, the combination with an agricultural implement, of fenders mounted at the sides of the implement, said fenders having top and side walls and rounded longitudinally extending corners joining the top and side walls, the forward ends of the upper walls of the fenders extending downwardly and forwardly in angular and rounded form, the forward wall of a horizontal section taken through the forward end of each fender forming an obtuse angle with the side wall of the fender.

3. In a means of the class described, the combination with an agricultural implement, of fenders mounted at the sides of the implement, said fenders having top and side walls and rounded longitudinally extending corners joining the top and side walls, the forward ends of the upper walls of the fenders extending downwardly and forwardly in angular and rounded form, and the forward ends of the side walls of the fender extending in angular form toward the forward end of the agricultural implement.

4. In a means of the class described, the combination with an agricultural implement having a supporting frame and tread members at the opposite lateral sides of the supporting frame, of fenders secured to the opposite lateral sides of the supporting frame and extending over the tread members and downwardly over the outer sides thereof, the upper and outer side walls of the fenders being joined by considerably rounded corners, the forward ends of the upper walls extending downwardly in angular and curved form and merging with the side walls in rounded corners.

5. In a means of the class described, the combination with an agricultural implement having a supporting frame and tread members at the opposite lateral sides of the supporting frame, of fenders secured to the opposite lateral sides of the supporting frame and extending over the tread members and downwardly over the outer sides thereof, the upper and outer side walls of the fenders being joined by considerably rounded corners, the forward and rear ends of the upper walls extending downwardly and outwardly in angular and curved form and merging with the side walls in rounded corners.

6. In a means of the class described, the combination with an agricultural implement having a supporting frame and tread members at the opposite lateral sides of the supporting frame, of fenders secured to the opposite lateral sides of the supporting frame and extending over the tread members, the upper and outer side walls of the fenders being joined by considerably rounded corners, the forward ends of the upper walls of the fenders extending downwardly and forwardly in angular and rounded form, the forward wall of a horizontal section taken through the forward end of each fender forming an obtuse angle with the side wall of the fender.

7. In a means of the class described, the combination with an agricultural implement having a supporting frame and tread members at the opposite lateral sides of the supporting frame, of fenders secured to the opposite lateral sides of the supporting frame and exending over the tread members, the upper and outer side walls of the fenders being joined by considerably rounded corners, the forward ends of the upper walls of the fenders extending downwardly and forwardly in angular and rounded form, and the forward ends of the side walls of the fender extending in angular form toward the forward end of the agricultural implement.

8. In a means of the class described, the combination with a tractor having at its opposite lateral sides track laying tread mechanisms, of fenders mounted on the tractor and extending longitudinally over the upper and outer side portions thereof, the forward end of each fender being rounded horizontally and positioned substantially at the horizontal median planes extending through the track laying tread mechanisms, the rounded lower portion of the forward end of the fender merging with the upper wall thereof in successively angular and curved form.

9. In a means of the class described, the combination with a tractor having at its opposite lateral sides track laying tread mechanisms, of fenders mounted on the tractor and extending longitudinally over the upper and side portions thereof, the forward end of each fender being rounded horizontally and positioned substantially at the horizontal median planes extending through the track laying tread mechanisms, the rounded lower portion of the forward end of the fender merging with the upper wall thereof in successively angular and curved form, said fender having an outer side wall forming with the forward end wall of the fender between the rounded lower portion and the upper wall an obtuse angle.

10. In a means of the class described, the combination with a tractor having at its opposite lateral sides track laying tread mechanisms, of fenders mounted on the tractor and extending longitudinally over the upper and side portions thereof, the forward end of each fender being rounded horizontally and positioned substantially at the horizontal median planes extending through the track laying tread mechanisms, the rounded lower portion of the forward end of the fender merging with the upper wall thereof in successively angular and curved form, said fender having an outer side wall forming with the forward end wall of the fender between the rounded lower portion and the upper wall an obtuse angle, the outer side wall forming a relatively deep apron over the outer side of the tread mechanism.

11. In a means of the class described, the combination with a tractor having at its opposite lateral sides track laying tread mechanisms, of fenders mounted on the tractor and extending longitudinally over the upper and side portions thereof, the forward end of each fender being rounded horizontally and positioned substantially at the horizontal median planes extending through the track laying tread mechanisms, the rounded lower portion of the forward end of the fender merging with the upper wall thereof in successively angular and curved form, said fender having an outer side wall forming with the forward end wall of the fender between the rounded lower portion and the upper wall an obtuse angle, the outer side wall of the fender merging with the inclined forward wall and with the upper wall in gradual curves.

12. A fender of the class described, comprising a longitudinally extending side wall extending from end to end of the fender, a top wall extending longitudinally of the fender but extending only a portion of the length thereof and front and rear end walls merging in curved form with the upper walls, the joint between the side wall and the top, front end and rear end walls being in gradual curves, said side, top, rear end and front end walls being formed of a single piece of sheet metal, the joint between the side wall and the upper wall being formed by bending said sides relative to each other and the joint between the front and the rear end walls and the side wall being formed by welding said walls together.

13. A fender of the class described, comprising a longitudinally extending side wall extending from end to end of the fender, a top wall extending longitudinally of the fender but extending only a portion of the length thereof, front and rear end walls merging in curved form with the upper walls, the joint between the side wall and the top, front end and rear end walls being in gradual curves, said side, top, rear end and front end walls being formed of a single piece of sheet metal, the joint between the side wall and the upper wall being formed by bending said sides relative to each other and the joint between the front and the rear end walls and the side wall being formed by welding said walls together, and securing flanges extending inwardly from the inner edges of the upper and the front and rear end walls and formed integrally with said walls.

14. In a means of the class described, the combination with an agricultural implement, of fenders mounted at the sides of the implement, said fenders having top and outer side walls and rounded longitudinally extending corners joining the top and side walls, one end of the upper wall extending downwardly and outwardly in angular and curved form and merging with the side wall in rounded corners.

In testimony whereof, I have hereunto set my hand at Los Angeles, California, this 14th day of March, 1930.

J. M. BOWMAN.